(12) United States Patent
Zhai et al.

(10) Patent No.: US 10,528,175 B2
(45) Date of Patent: Jan. 7, 2020

(54) DISPLAY PANEL, TOUCH DISPLAY DEVICE AND TOUCH PRESSURE DETECTING METHOD BY SELECTIVELY ENABLING PRESSURE SENSORS

(71) Applicant: SHANGHAI TIANMA MICRO-ELECTRONICS CO., LTD., Shanghai (CN)

(72) Inventors: Yingteng Zhai, Shanghai (CN); Feng Lu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 86 days.

(21) Appl. No.: 15/863,966

(22) Filed: Jan. 7, 2018

(65) Prior Publication Data

US 2018/0129343 A1 May 10, 2018

(30) Foreign Application Priority Data

Jun. 30, 2017 (CN) .......................... 2017 1 0523738

(51) Int. Cl.
*G06F 3/041* (2006.01)
*G06F 3/044* (2006.01)
*G06F 1/3234* (2019.01)

(52) U.S. Cl.
CPC .......... *G06F 3/04142* (2019.05); *G06F 3/044* (2013.01); *G06F 3/0416* (2013.01);
(Continued)

(58) Field of Classification Search
CPC .... G06F 3/04142; G06F 3/0416; G06F 3/044; G06F 3/0418; G06F 3/016; G06F 3/041;
(Continued)

(56) References Cited

U.S. PATENT DOCUMENTS 8,179,378 B2 * 5/2012 Aono ...................... G06F 3/016
178/18.01
2008/0108340 A1 * 5/2008 Karstens ........... H04M 1/72569
455/418
(Continued)

FOREIGN PATENT DOCUMENTS

CN 105630251 A 6/2016
CN 105975137 A 9/2016

*Primary Examiner* — Darlene M Ritchie
(74) *Attorney, Agent, or Firm* — Kilpatrick Townsend & Stockton, LLP

(57) ABSTRACT

Provided are a display panel, a touch display device and a touch pressure detecting method. The display panel includes: a substrate, including a display region and a non-display region surrounding the display region; at least two pressure sensors disposed in the non-display region; a control module electrically connected to the pressure sensor is configured to control the operation state of each of the pressure sensors; during the touch pressure detection stage, the operation state of each of the pressure sensors is adjusted based on the current touch position in such a way that at least one of the pressure sensors corresponding to the touch position and meeting a preset corresponding relation is enabled to be in a working state, other pressure sensors are in an off state so as to perform the touch pressure detection.

16 Claims, 20 Drawing Sheets

(52) U.S. Cl.
CPC .......... *G06F 1/3262* (2013.01); *G06F 3/0412* (2013.01); *G06F 2203/04105* (2013.01); *G06F 2203/04106* (2013.01)

(58) Field of Classification Search
CPC . G06F 2203/04106; G06F 2203/04105; G06F 2203/041; G06F 3/0412; G06F 3/0414; G06F 1/3262
See application file for complete search history.

(56) References Cited

U.S. PATENT DOCUMENTS

| | | | | |
|---|---|---|---|---|
| 2008/0170043 A1* | 7/2008 | Soss | .................. | G06F 3/0414 345/173 |
| 2009/0315575 A1* | 12/2009 | Yoshioka | .............. | G01D 3/021 324/705 |
| 2010/0053116 A1* | 3/2010 | Daverman | ............ | G06F 3/0414 345/175 |
| 2010/0229091 A1* | 9/2010 | Homma | ............. | G06F 3/04883 715/702 |
| 2013/0018489 A1* | 1/2013 | Grunthaner | ............ | G06F 3/041 700/73 |
| 2013/0076646 A1* | 3/2013 | Krah | .................. | G06F 3/0414 345/173 |
| 2015/0002452 A1* | 1/2015 | Klinghult | ............. | G06F 3/0416 345/174 |
| 2015/0062031 A1* | 3/2015 | Kono | .................... | G06F 3/041 345/173 |
| 2015/0116233 A1* | 4/2015 | Kono | .................... | G06F 3/041 345/173 |
| 2015/0199061 A1* | 7/2015 | Kitada | ................... | G06F 3/044 345/173 |
| 2015/0301684 A1* | 10/2015 | Shimamura | ........... | G06F 3/0414 345/174 |
| 2017/0038879 A1* | 2/2017 | Hsiao | ................... | G06F 3/0414 |
| 2017/0192596 A1* | 7/2017 | Lee | ........................ | G01L 1/146 |
| 2017/0269748 A1* | 9/2017 | Ding | .................... | G02F 1/13338 |
| 2017/0277296 A1* | 9/2017 | Reynolds | ............... | G06F 3/044 |
| 2018/0011581 A1* | 1/2018 | Kim | ........................ | G06F 3/0414 |
| 2018/0035923 A1* | 2/2018 | Kang | .................... | A61B 5/117 |
| 2018/0039368 A1* | 2/2018 | Choi | ..................... | G06F 3/016 |
| 2018/0039392 A1* | 2/2018 | Kim | ...................... | G06F 3/0414 |
| 2018/0052350 A1* | 2/2018 | Zhao | ................... | G02F 1/13338 |
| 2018/0074636 A1* | 3/2018 | Lee | ......................... | G06F 3/0414 |
| 2018/0088728 A1* | 3/2018 | Wurzel | .................. | G06F 1/163 |
| 2018/0164940 A1* | 6/2018 | Li | .......................... | G06F 3/0414 |
| 2018/0182901 A1* | 6/2018 | Lim | ........................ | H01L 29/786 |
| 2018/0196569 A1* | 7/2018 | Jun | ......................... | G06F 3/044 |
| 2018/0224990 A1* | 8/2018 | Shim | ..................... | G06F 3/0484 |
| 2018/0307365 A1* | 10/2018 | Chen | ..................... | G06F 1/3262 |
| 2018/0335883 A1* | 11/2018 | Choi | .................... | G06F 3/0414 |
| 2018/0348980 A1* | 12/2018 | Ma | ........................ | G06F 3/0484 |
| 2019/0129557 A1* | 5/2019 | Liu | ........................ | G06F 3/041 |

* cited by examiner

DISPLAY PANEL, TOUCH DISPLAY DEVICE AND TOUCH PRESSURE DETECTING METHOD BY SELECTIVELY ENABLING PRESSURE SENSORS

CROSS-REFERENCE TO RELATED APPLICATIONS

This application claims priority to a Chinese patent application No. 201710523738. X filed on Jun. 30, 2017, the disclosure of which is incorporated herein by reference in its entirety.

TECHNICAL FIELD

The present disclosure relates to touch pressure detection technologies, in particular to a display panel, a touch display device and a touch pressure detecting method.

BACKGROUND

At present, the display panel integrated with a touch electrode is widely applied in various electronic devices, e.g. mobile phones, tablet computers and kiosks in the public place. As such, the user may perform the operations on the electronic devices by merely touching the icons in the electronic devices using his finger, so that the user does not need other input devices (e.g. keyboards and mices), thereby making a human-machine interaction easier.

In order to better meet the requirements for the users, a pressure sensor is commonly integrated into the display panel to detect the magnitude of the touch pressure when the users touching the display panel, thereby improving the applied range of touch technologies. For the display panels in the prior art, a plurality of pressure sensors are commonly provided into the display panel. In the touch pressure detection stage, each of the pressure sensors are turned on simultaneously to detect the strain caused by the touch pressure, thereby determining the magnitude of the touch pressure. During this process, the display panel may use a lot of energy, thereby increasing the power consumption of the display panel. In addition, during this process, a large amount of heat is generated, which leads to an excessively high temperature in partial area of the display panel, and even the performance of other functional film layers (e.g. a functional film layer for displaying an image) is affected thereby and the display panel is not operated properly.

SUMMARY

The embodiments of the present disclosure provide a display panel, a touch display device and a touch pressure detecting method so as to achieve the reduction on the power consumption and decrease the generated heat during the touch pressure detection of the display panel.

In a first aspect, the embodiments of the present disclosure provide a display panel, the display panel includes a substrate, including a display region and a non-display region surrounding the display region, at least two pressure sensors arranged in the non-display region. The display panel further includes a control module electrically connected to the pressure sensors, which is configured to control an operation state of each of the pressure sensors, in a touch pressure detection stage, the operation state of each of the pressure sensors is adjusted based on the current touch position in such a way that at least one of pressure sensors corresponding to the touch position and meeting a preset corresponding relation is enabled to be in a working state and other pressure sensors are enabled to be in an off state, so as to perform the touch pressure detection.

In a second aspect, the present disclosure has further provided a touch display device, the touch display device includes any one of the display panels provided by the embodiments of the present disclosure.

Moreover, the present disclosure has further provided a touch pressure detecting method for the display panel provided by the embodiments of the present disclosure, the display panel includes a touch position detection stage and a touch pressure detection stage; in the touch position detection stage, obtaining the current touch position; in the touch pressure detection stage, the operation state of each of the pressure sensors is adjusted based on the current touch position in such a way that at least one of the pressure sensors corresponding to the touch position and meeting a preset corresponding relation is enabled to be in a working state working state and other pressure sensors are in an off state, so as to perform the touch pressure detection.

In the touch pressure detection stage provided by the embodiments of the present disclosure, the operation state of each of the pressure sensors is adjusted based on the current touch position in such a way that at least one of the pressure sensors corresponding to the touch position and meeting the preset corresponding relation is enabled to be in a working state, and other pressure sensors are enabled to be in an off state so as to perform the touch pressure detection, thereby solving the problems of display panels in a prior art that a high power consumption and excessively generated heat due to simultaneously turning on each of the pressure sensors in the touch pressure detection stage, achieving the reduction on the power consumption and the generated heat of the display panel during the touch pressure detection.

DETAILED DESCRIPTION

Figure 1:
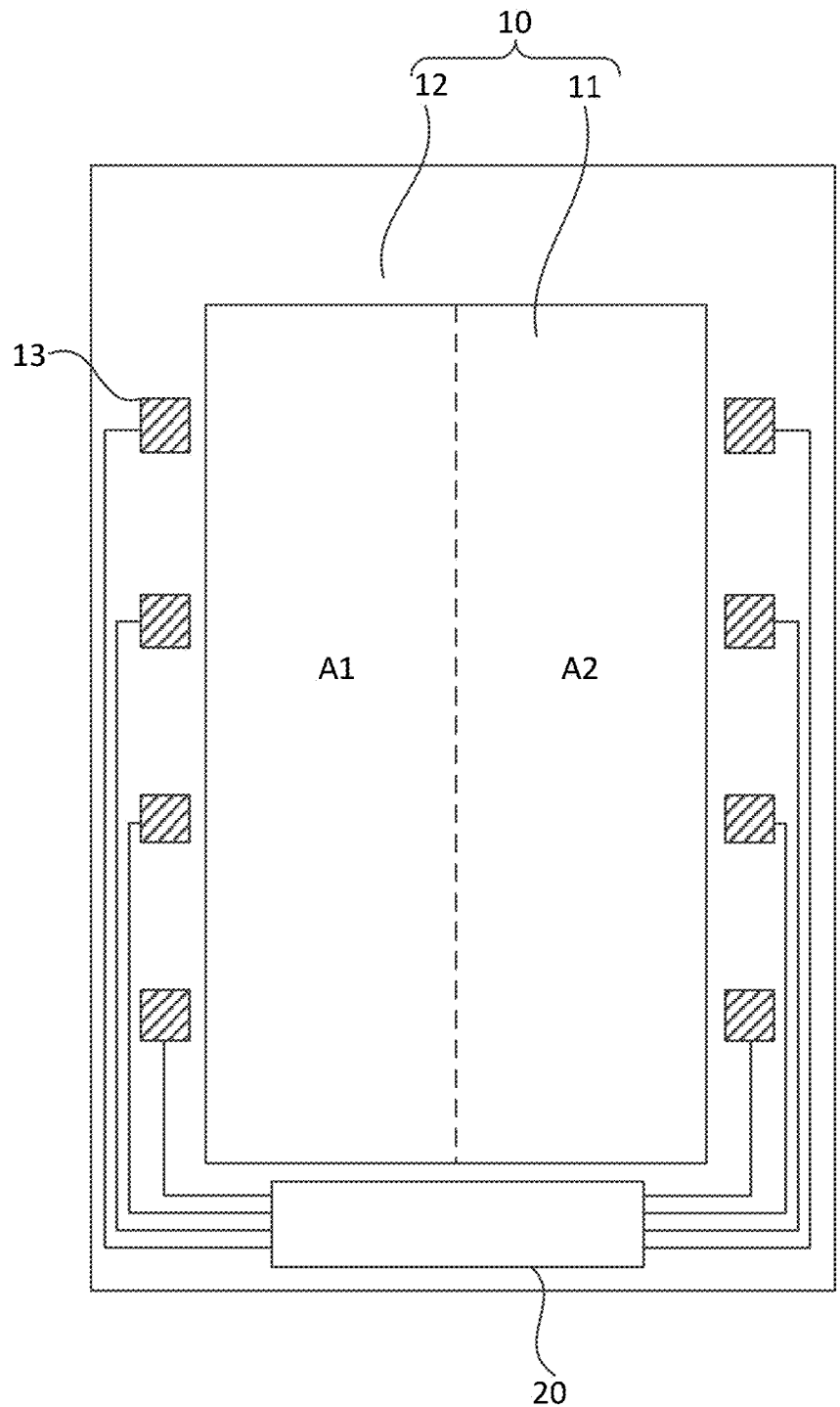
FIG. 1 is a structural diagram showing a display panel according to an embodiment of the present disclosure.

The present disclosure is further described below in combination with the drawings and embodiments. It should be understood, the specific embodiments described herein are merely used to explain the present disclosure rather than limiting the present disclosure. In addition, it should be stated that in order to facilitate the description, merely a part of structures related to the present disclosure rather than the whole structure are illustrated in the drawings.

FIG. 1 is a structural diagram showing a display panel according to an embodiment of the present disclosure. Referring to FIG. 1, the display panel includes: a display substrate 10 including a display region 11 and a non-display region 12 surrounding the display region 11; at least two pressure sensors 13 in the non-display region; a control module 20 electrically connected to the pressure sensor 13, which is configured to control an operation state of each of the pressure sensors 13; in the touch pressure detection stage, the operation state of each of the pressure sensors 13 is adjusted based on the current touch position, so that the pressure sensor 13 corresponding to the touch position and meeting a preset corresponding relation is in a working state, other pressure sensors 13 are in an off state so as to perform the touch pressure detection.

In above technical solutions, the preset corresponding relation indicates the corresponding relation between the touch position and the pressure sensor 13. The corresponding relation herein may be set arbitrarily, or may be set according to a certain condition (e.g. the performance of the pressure sensor).

In practice, the corresponding relations may be set in various manners. For example, the display panel may be divided into a plurality of sub-touch regions, and each sub-touch region is configured to correspond to at least one pressure sensor, each of the touch positions located in a sub-touch region may correspond to the pressure sensor corresponding to the sub-touch region.

Exemplarily, referring to FIG. 1, the display region 11 is divided into two sub-touch regions, namely a sub-touch region A1 and a sub-touch region A2. The dash line in FIG. 1 represents the boundary line between the sub-touch region A1 and the sub-touch region A2. Here, each of the pressure sensors 13 at the left side of the sub-touch region A1 is configured to correspond to the sub-touch region A1, and each of the pressure sensors 13 at the right side of the sub-touch region A2 is configured to correspond to the sub-touch region A2. In this configuration, the preset corresponding relation may represent that, touch positions located in the sub-touch region A1 corresponds to the pressure sensors at the left side of the sub-touch region A1, the touch positions located in the sub-touch region A2 corresponds to the pressure sensors at the right side of the sub-touch region A2.

Figure 2:
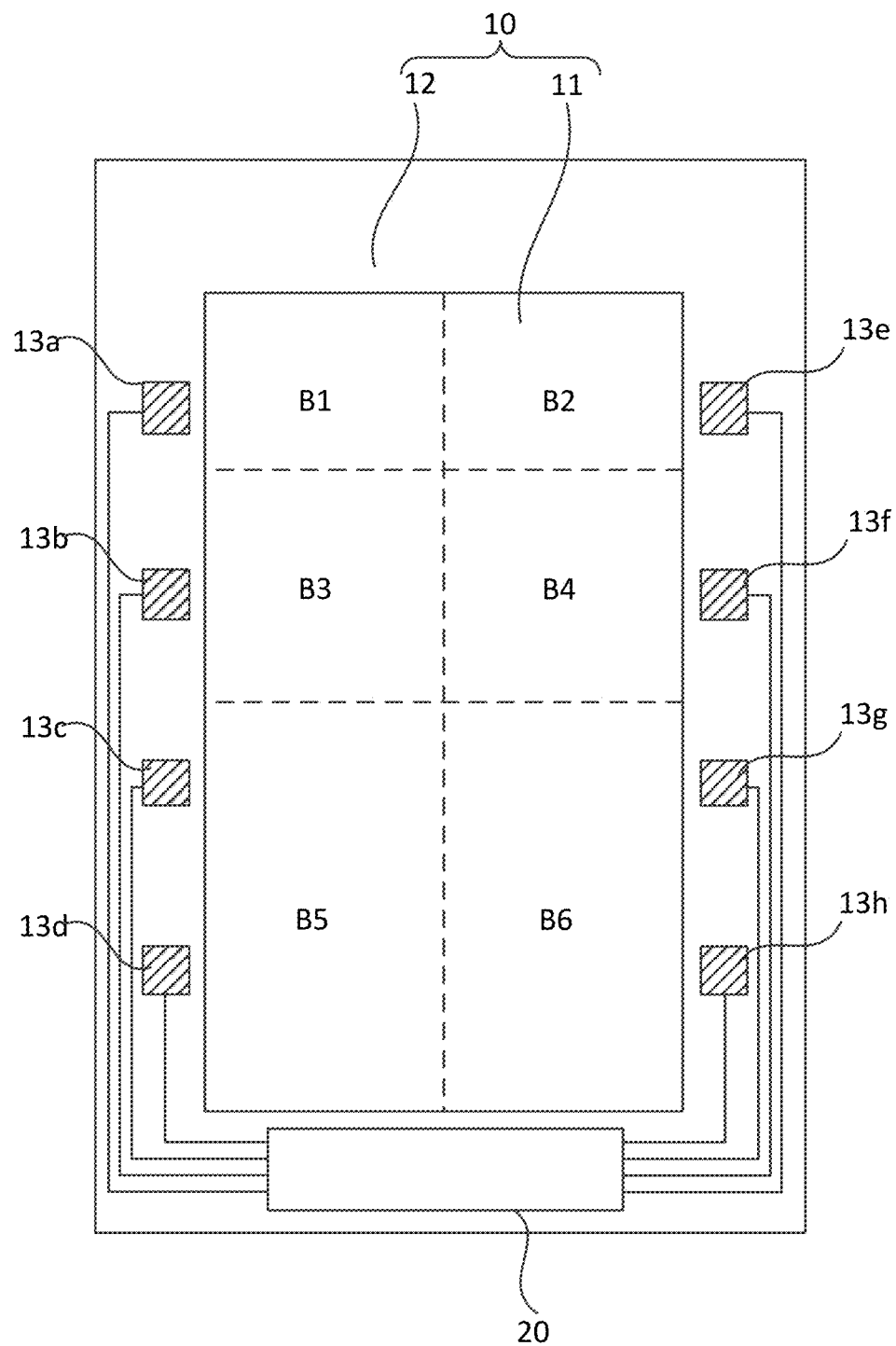
FIG. 2 is a structural diagram showing another display panel according to an embodiment of the present disclosure.

It should be noted that, the corresponding relations between the sub-touch regions and the pressure sensors may be arbitrary. Specifically, FIG. 2 is a structural diagram showing another display panel according to an embodiment of the present disclosure. The dash line in FIG. 2 represents the boundary line between two adjacent sub-touch regions. Referring to FIG. 2, the display region 11 of the display panel is divided into six sub-touch regions, namely a sub-touch region B1, a sub-touch region B2, a sub-touch region B3, a sub-touch region B4, a sub-touch region B5 and a sub-touch region B6, respectively. Eight pressure sensors are provided in the non-display region 12 of the display panel, namely a pressure sensor 13$a$, a pressure sensor 13$b$, a pressure sensor 13$c$, a pressure sensor 13$d$, a pressure sensor 13$e$, a pressure sensor 13$f$, a pressure sensor 13$g$ and a pressure sensor 13$h$. The sub-touch region B4 may correspond to only the pressure sensor 13$f$, or correspond to both the pressure sensor 13$f$ and 13$g$. Similarly, the sub-touch region B5 may correspond to both the pressure sensors 13$c$ and 13$d$, or correspond to merely the pressure sensor 13$c$, or correspond to both the pressure sensors 13$d$ and 13$a$. In addition, each of the pressure sensors may correspond to merely one of the sub-touch regions, or correspond to two or more of the sub-touch regions. For example, the pressure sensor 13$c$ may correspond to merely the sub-touch region B5, or correspond to both the sub-touch region B5 and the sub-touch region B3.

Based on above technical solutions, when detecting the touch pressure, optionally, the current touch position is obtained, the sub-touch region where the current touch position is located is determined, the pressure sensor corresponding to the sub-touch region is turned on, and other pressure sensors in the display panel are turned off, so as to perform the touch pressure detection.

Figure 3:
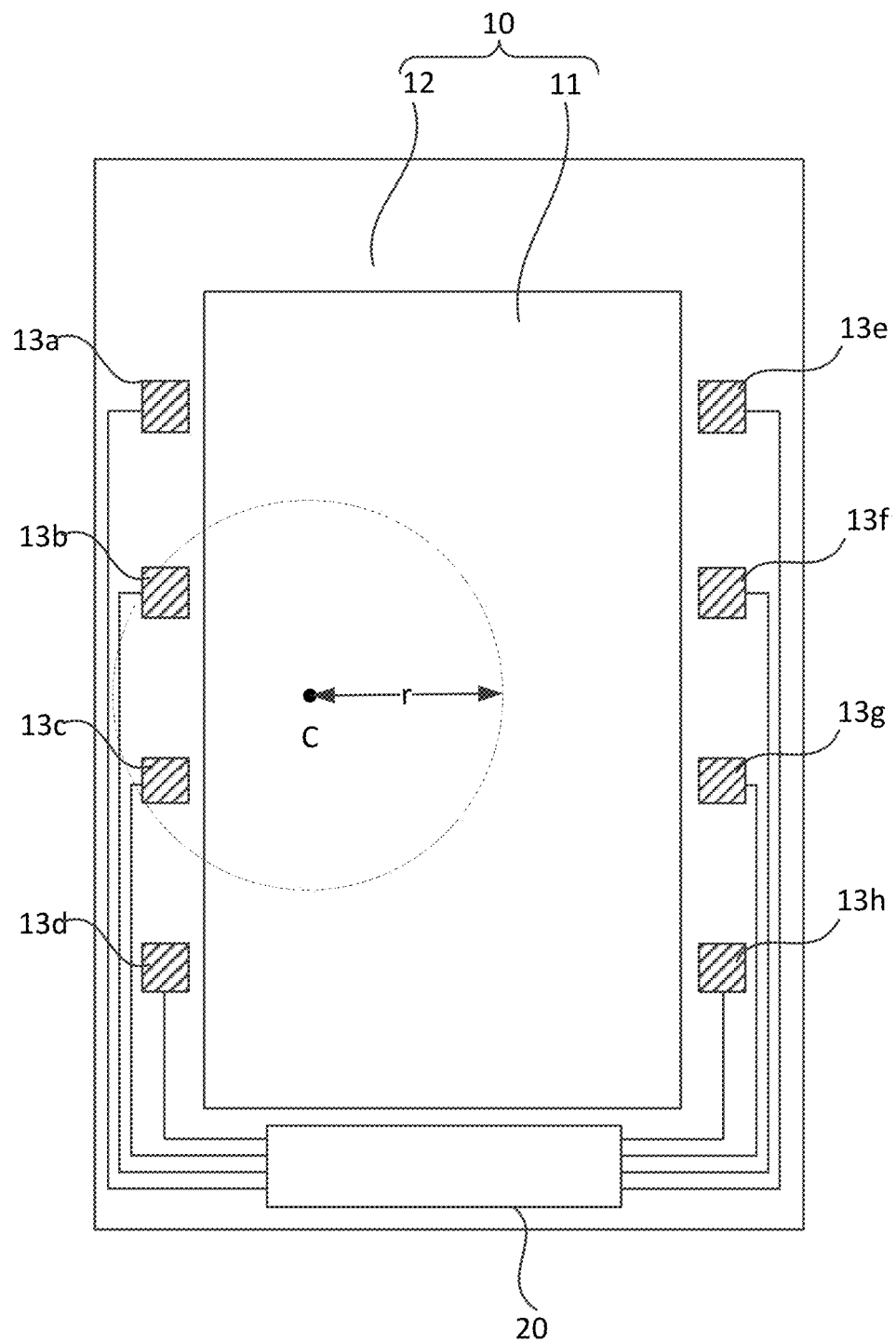
FIG. 3 is a structural diagram showing another display panel according to an embodiment of the present disclosure.

Optionally, the preset corresponding relation may also represent that: a touch position corresponds to the pressure sensors in a circular area with the center located at the touch position and radius equal to a preset distance. FIG. 3 is a structural diagram showing another display panel according to an embodiment of the present disclosure. Referring to FIG. 3, when the touch position is in a point C, the area with the center at point C and the radius r equal to a preset distance is a circular area represented by a dash line in which two pressure sensors are included, namely the pressure sensor 13$b$ and the pressure sensor 13$c$. The touch position (point C) can correspond to the pressure sensor 13$b$ and the pressure sensor 13$c$.

In the touch pressure detection stage, the distance between the current touch position and each of the pressure sensors is calculated based on the current touch position, at least one of the pressure sensors which the distance between the current touch position and the pressure sensor is less than the preset distance is turned on, and other pressure sensors in the display panel are turned off.

It should be noted that, under the condition that the same bias voltage is applied to the pressure sensors, the closer the touch position is to the pressure sensor, the larger the pressure-sensitive detection signal is detected by the pressure sensor. Therefore when setting the corresponding relation, the distance between the current touch position and the pressure sensors may be an important consideration.

With above technical solutions, in the touch pressure detection stage, the operation state of each of the pressure sensors is adjusted based on the current touch position, so that the pressure sensor corresponding to the touch position and meet the preset corresponding relation is in a working state, and other pressure sensors are in an off state so as to perform the touch pressure detection. In this configuration, a part of the pressure sensors instead of all the pressure sensors are turned on during the touch pressure detection stage, thereby solving the problems of display panel in a prior art that a high power consumption and excessively generated heat of the display panel due to turning on of each of the pressure sensors in the touch pressure detection stage, achieving the reduction on the power consumption and the generated heat of the display panel during the touch pressure detection, and avoiding the affection on the performance of other functional film layers (e.g. a functional film layer for displaying an image) and even the improperly worked display panel due to the excessively high temperature in partial area of the display panel.

Figure 4:
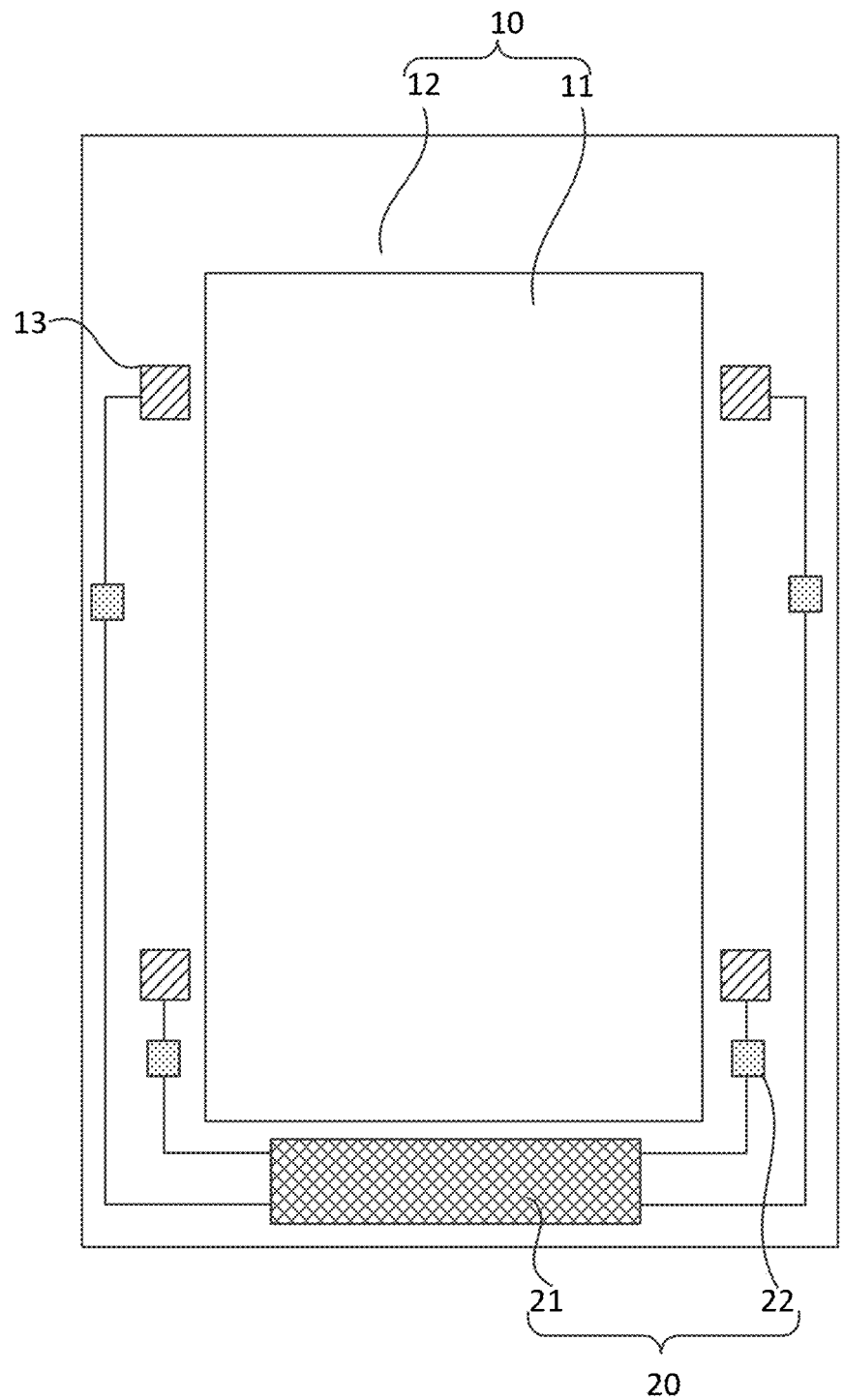
FIG. 4 is a structural diagram showing another display panel according to an embodiment of the present disclosure.

FIG. 4 is a structural diagram showing another display panel according to an embodiment of the present disclosure. Referring to FIG. 4, the control module 20 of the display panel includes a control chip 21 and at least a control switch 22; the control chip 21 is electrically connected to the control switch 22, the control switch 22 is electrically connected to the pressure sensor 13, the control chip 21 is configured to control the operation state of the pressure sensor 13 by controlling turning on and turning off of the control switch 22. Thereby the independence of each of the pressure sensors is further enhanced, so that the pressure sensors are not interfered to each other, and thus may be beneficial to adjust the operation state of each of the pressure sensors 13.

Figure 5:
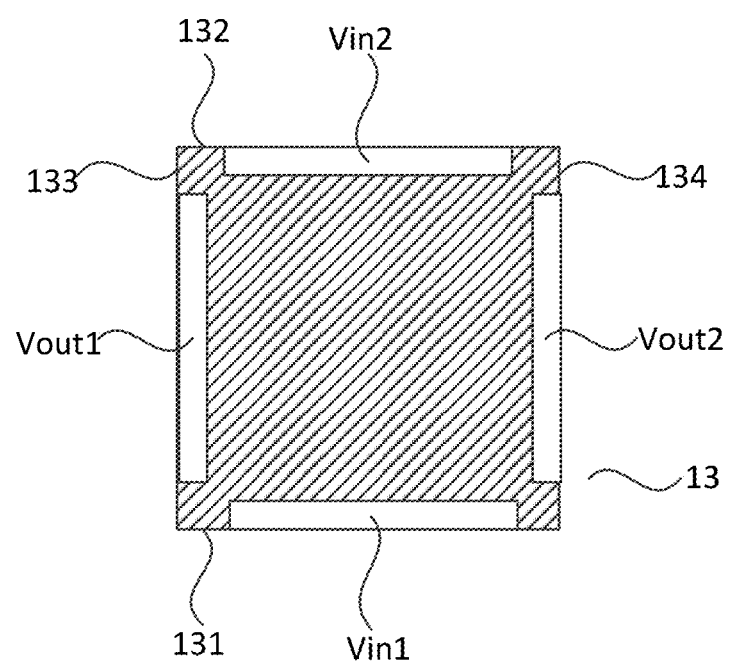
FIG. 5 is a structural diagram showing a pressure sensor according to an embodiment of the present disclosure.

FIG. 5 is a structural diagram showing a pressure sensor according to an embodiment of the present disclosure. Referring to FIG. 5, the pressure sensor 13 is a quadrangle and made of semiconductor material. The pressure sensor 13 includes a first side 131 and a second side 132 opposite to each other, and a third side 133 and a fourth side 134 opposite to each other; the pressure sensor 13 includes a first power signal inputting terminal Vin1 at the first side 131 and a second power signal inputting terminal Vin2 at the second side 132, to input a bias voltage signal to the pressure sensor; the pressure sensor 13 further includes a first sense signal measuring terminal Vout1 at the third side 133 and a second sense signal measuring terminal Vout2 at the fourth side 134, to output an pressure-sensitive detection signal of the pressure sensor 13.

Figure 6:
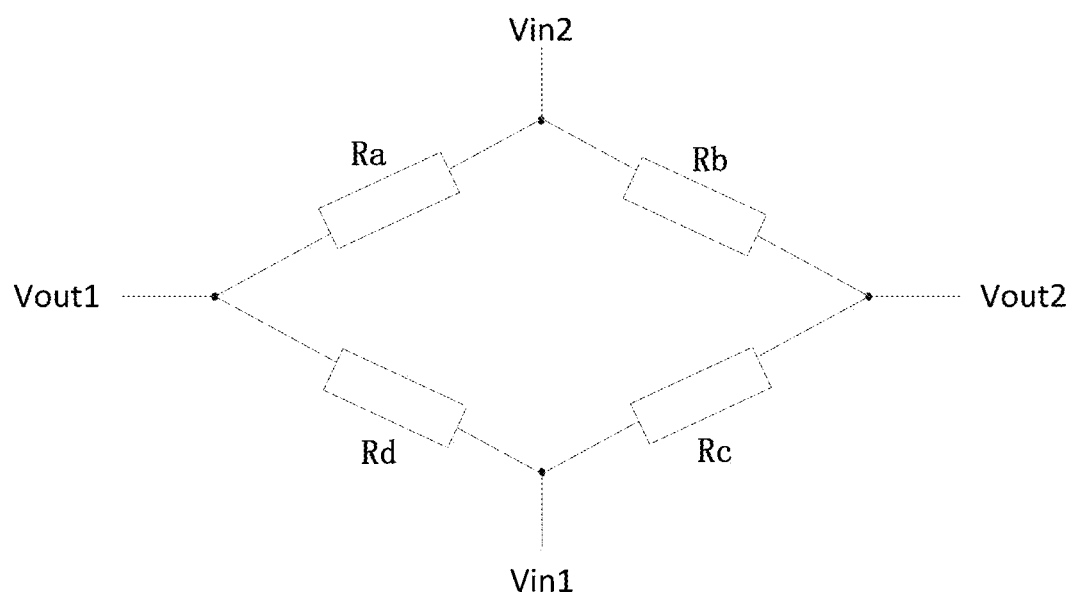
FIG. 6 is an equivalent circuit diagram for the pressure sensor shown in FIG. 5.

FIG. 6 is an equivalent schematic diagram for the pressure sensor shown in FIG. 5. Referring to FIG. 5 and FIG. 6, the pressure sensor 13 may be equivalent to a Wheatstone bridge. The Wheatstone bridge includes four equivalent resistors, namely the equivalent resistor Ra, the equivalent resistor Rb, the equivalent resistor Rc and the equivalent resistor Rd respectively, and the equivalent resistor Ra is located between the second power signal inputting terminal Vin2 and the first induction signal measuring terminal Vout1, the equivalent resistor Rb is located between the second power signal inputting terminal Vin2 and the second induction signal measuring terminal Vout2, the equivalent resistor Rd is located between the first power signal inputting terminal Vin1 and the first induction signal measuring terminal Vout1, the equivalent resistor Rc is located between the first power signal inputting terminal Vin1 and the second induction signal measuring terminal Vout2. When a bias voltage signal is applied to the first power signal inputting terminal Vin1 and the second power signal inputting terminal Vin2, a current flows through each branch of the Wheatstone bridge. At this time, when the display panel is applied by a pressure, at least one of the internal equivalent resistor Ra, the equivalent resistor Rb, the equivalent resistor Rc and/or the equivalent resistor Rd changes in resistance, since the pressure sensor 13 is affected by the shearing force from the position corresponding to the pressure sensor 13 in the display panel, so that the difference between the pressure-sensitive detection signals outputted from the first induction signal measuring terminal Vout1 and the second induction signal measuring terminal Vout2 of the pressure sensor 13 is different from the difference between the pressure-sensitive detection signals outputted from the first induction signal measuring terminal Vout1 and the second induction signal measuring terminal Vout2 without the applied pressure. Therefore, the magnitude of the touch pressure may be determined.

Figure 7:
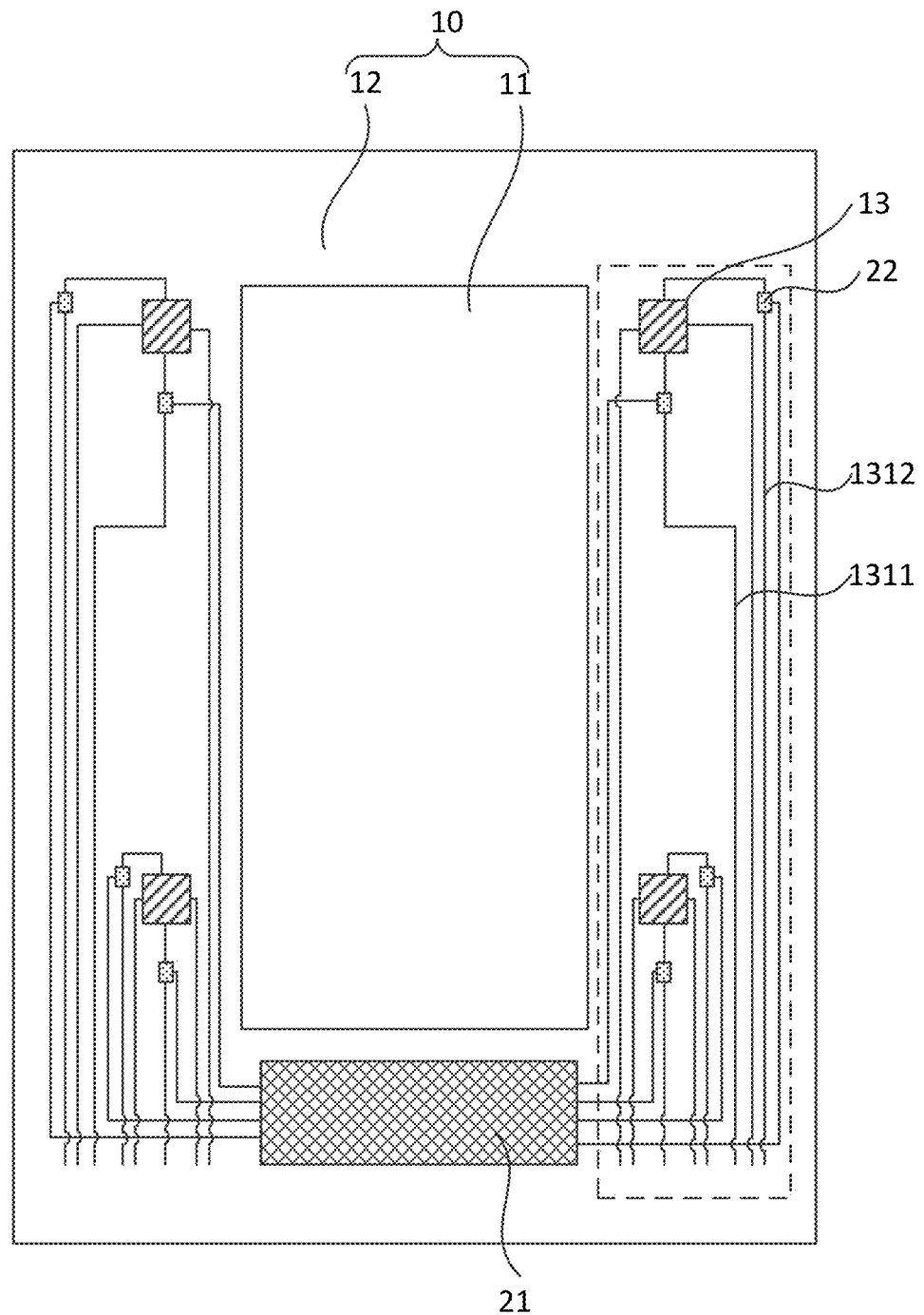
FIG. 7 is a structural diagram showing another display panel according to an embodiment of the present disclosure.
Figure 8:
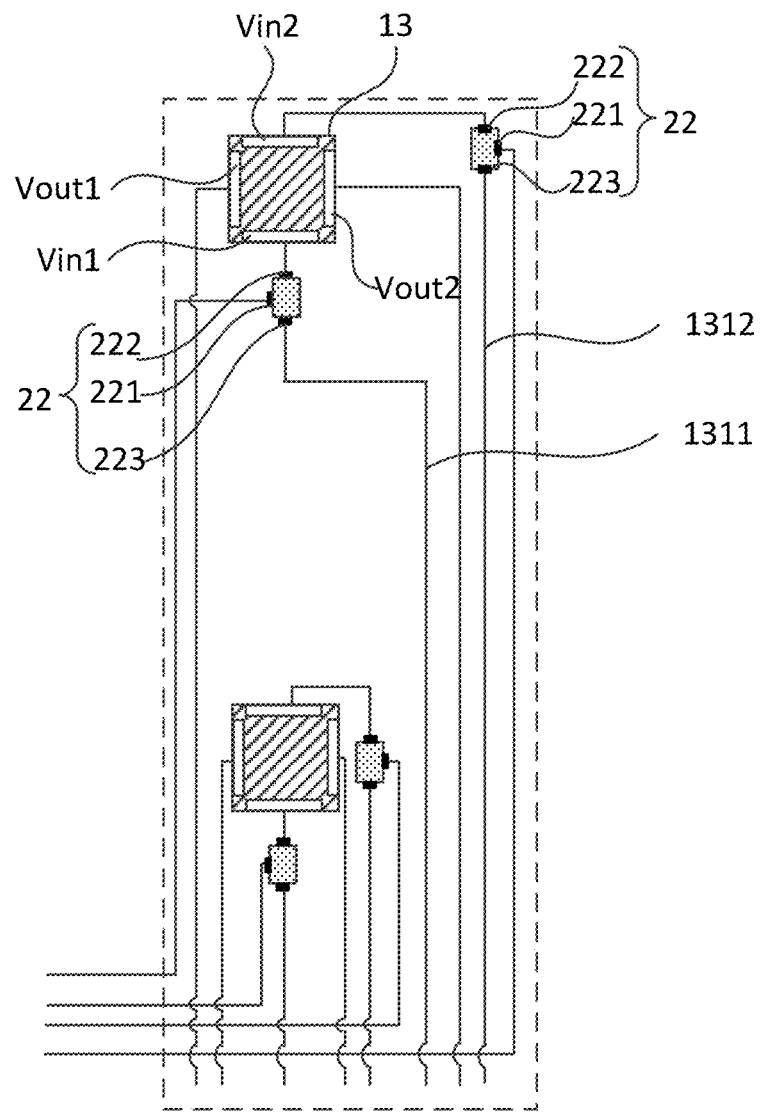
FIG. 8 is an enlarged drawing of the dotted area shown in FIG. 7.

FIG. 7 is a structural diagram showing another display panel according to an embodiment of the present disclosure. FIG. 8 is an enlarged view of the dashed area shown in FIG. 7. Referring to FIG. 7 and FIG. 8, the display panel includes at least a first signal input line 1311 and at least a second signal input line 1312. The control switch 22 includes a control terminal 221, a first electrode 222 and a second electrode 223; the control terminal 221 is electrically connected to the control chip 21, to control turning on and turning off of the control switch 22; the first electrode 222 is electrically connected to the first power signal inputting terminal Vin1 of the pressure sensor 13, the second electrode 223 is electrically connected to the first signal input line 1311; or, the first electrode 222 is electrically connected to the second power signal inputting terminal Vin2 of the pressure sensor 13, the second electrode 223 is electrically connected to the second signal input line 1312. The advantage of the above configuration lies in that the operation state of each of the pressure sensors 13 may be targetedly controlled, so that during the touch pressure detection, only a part of the pressure sensors in the display panel are turned on, thereby reducing the power consumption and heat dissipation.

Figure 9:
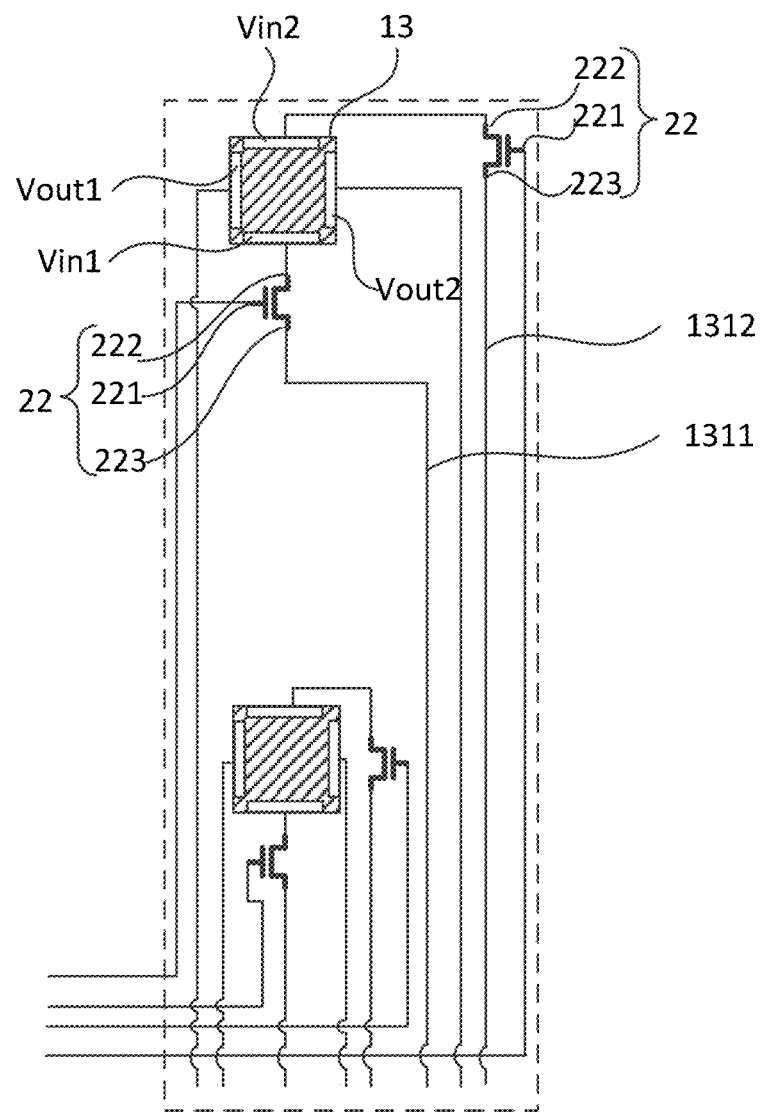
FIG. 9 is a partial structural diagram showing another display panel according to an embodiment of the present disclosure.

Specifically, there are various structures for the control switch. FIG. 9 is a partial structure diagram showing another display panel according to an embodiment of the present disclosure. FIG. 9 gives an exemplary description of a structure of the control switch. Referring to FIG. 9, the control switch 22 includes a thin film transistor. The thin film transistor includes a source electrode, a drain electrode and a gate electrode; and the source electrode is the second electrode 223 of the control switch 22, the drain electrode is the first electrode 222 of the control switch 22, the gate electrode is the control terminal 221 of the control switch 22. The advantages of using a thin film transistor as the control switch lies in that, the structure is simple, the area for manufacturing the thin film transistor in the non-display region is small and it conforms to developing trends of narrow bezel design. In addition, the display panel generally includes a plurality of thin film transistors which are used to control the operation states of the pixel units, and thin film transistors which are integrated into the shift registers to generate scanning signals. In one embodiment, the thin film transistors acting as the control switch may be manufactured in the same process with the thin film transistors used to control the operation states of the pixel units and thin film transistors which are used to generate scanning signals, thereby reducing the number of the processes, simplifying the manufacturing process and reducing the production cost.

Figure 10:
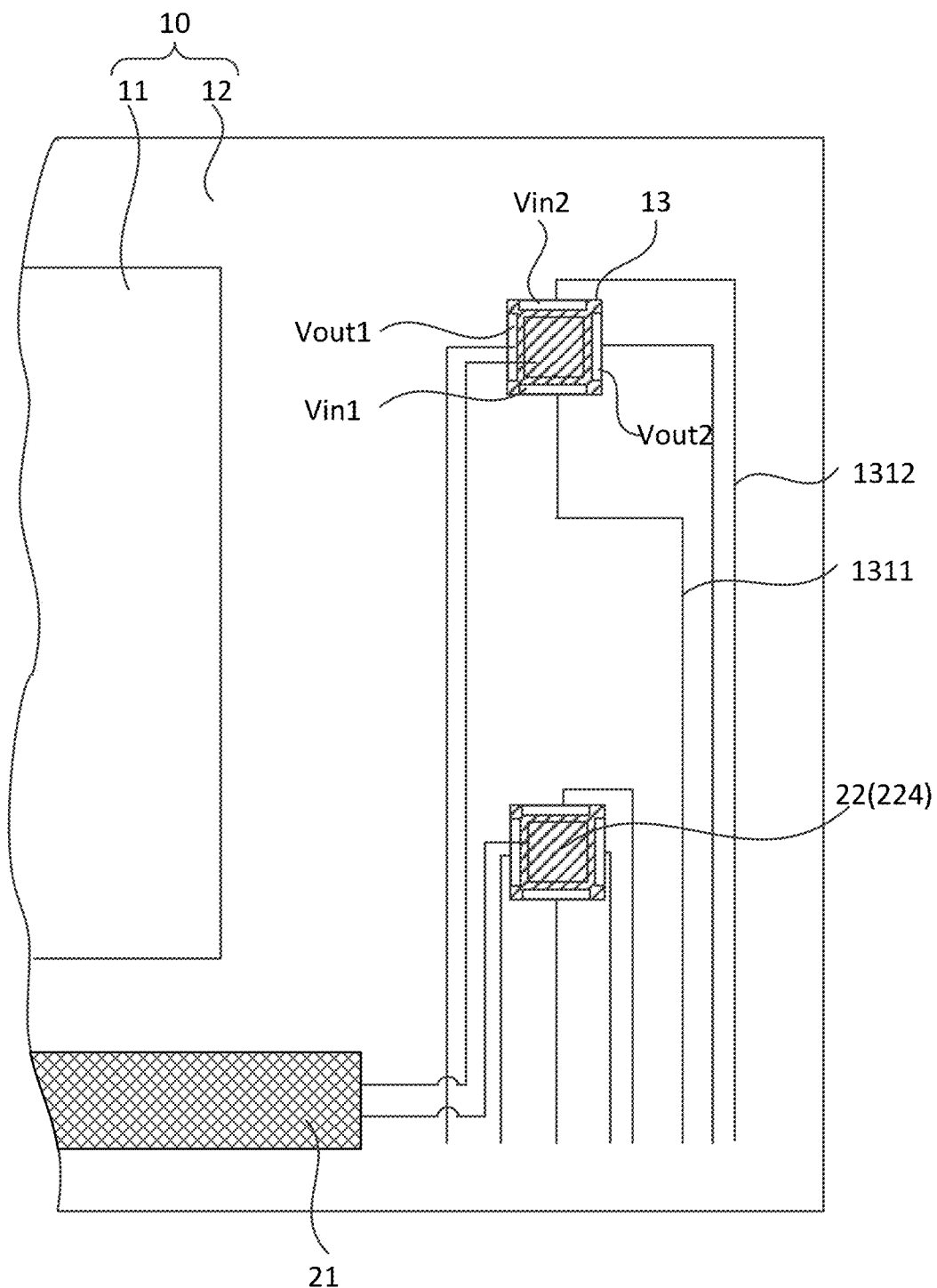
FIG. 10 is a partial structural diagram showing another display panel according to an embodiment of the present disclosure.

FIG. 10 is a partial structure diagram showing another display panel according to an embodiment of the present disclosure. The difference from the display panel shown in FIG. 8 and FIG. 9 lies in that, the control switch 22 includes the control electrode 224 shown in FIG. 10. Referring to FIG. 10, the perpendicular projection of the control electrode 224 on the substrate 10 is at least partially overlapped with the perpendicular projection of the pressure sensor 13 on the substrate 10, and the control electrode 224 is configured to be insulated with the pressure sensor 13 and is electrically connected to the control chip 21. Here, the control electrode 224 is equivalent to the gate electrode of the thin film transistor, and the overlapped area between the pressure sensor 13 and perpendicular projection of the control electrode 224 on the pressure sensor 13 is equivalent to the channel zone of the thin film transistor. When the voltage of the control electrode 224 is increased to a certain value, the channel zone would be conducted and the pressure sensor 13 is in working state; when the voltage of the control electrode is less than the certain value, the pressure sensor 13 is in off state. Since the perpendicular projection of the control electrode 224 acting as the control switch 22 on the substrate 10 is at least partially overlapped with the perpendicular projection of the pressure sensor 13 on the substrate 10, from a view along direction perpendicular to the display panel, the control electrode 224 is overlapped with the pressure sensor 13 so that it does not occupy the area of the non-display region, thereby conforming to the developing trends of narrow frame design.

Figure 11:
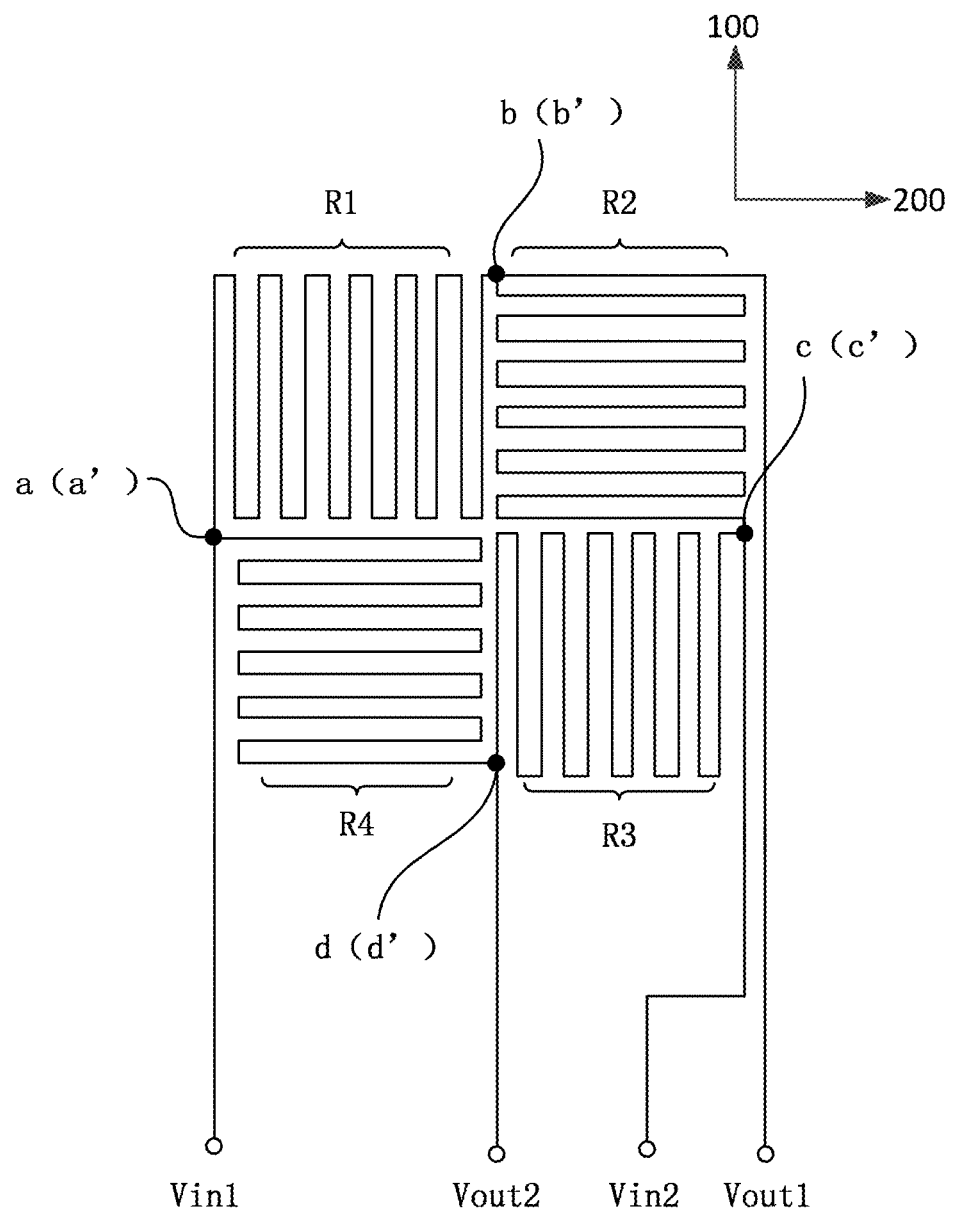
FIG. 11 is a structural diagram showing another pressure sensor according to an embodiment of the present disclosure.

FIG. 11 is a structural diagram showing another pressure sensor according to an embodiment of the present disclosure. Referring to FIG. 11, the pressure sensor includes a first inductive resistor R1, a second inductive resistor R2, a third inductive resistor R3 and a fourth inductive resistor R4; a first end a of the first inductive resistor R1 and a first end a' of the fourth inductive resistor R4 are electrically connected to the first power signal inputting terminal Vin1, the second end b of the first inductive resistor R1 and the first end b' of the second inductive resistor R2 are electrically connected to the first induction signal measuring terminal Vout1, a second end d of the fourth inductive resistor R4 and a first end d' of third inductive resistor R3 are electrically connected to the second induction signal measuring terminal Vout2, a second end c of the second inductive resistor R2 and a second end c' of the third inductive resistor R3 are electrically connected to second power signal inputting terminal Vin2; the first power signal inputting terminal Vin1 and the second power signal inputting terminal Vin2 are configured to input the bias voltage signal to the pressure sensor; the first induction signal measuring terminal Vout1 and the second induction signal measuring terminal Vout2 are configured to output the pressure-sensitive detection signal of the pressure sensor.

Still referring to FIG. 11, the Wheatstone bridge is formed by the first inductive resistor R1, the second inductive resistor R2, the third inductive resistor R3 and the fourth inductive resistor R4. When a bias voltage signal is applied to the first power signal inputting terminal Vin1 and the second power signal inputting terminal Vin2, a current flows through each branch of the Wheatstone bridge. At this time, when the display panel is applied by a pressure, a resistance change occurs in each internal resistor (including the first inductive resistor R1, the second inductive resistor R2, the third inductive resistor R3 and the fourth inductive resistor R4), since the pressure sensor 13 is affected by the shearing force from the position corresponding to the pressure sensor 13 in the display panel, so that the difference between the pressure-sensitive detection signal outputted from the first induction signal measuring terminal Vout1 and the second induction signal measuring terminal Vout2 of the pressure sensor 13 is different from that between the first induction signal measuring terminal Vout1 and the second induction signal measuring terminal Vout2 without the applied pressure. Therefore, the magnitude of touch pressure may be determined.

It should be noted that, since the Wheatstone bridge is disposed in the display panel, when the display panel is applied by a pressure, the display panel is deformed, so that the first inductive resistor R1, the second inductive resistor R2, the third inductive resistor R3 and the fourth inductive resistor R4 are all deformed. In order to detect the magnitude of the touch pressure, the deformation induced in the first inductive resistor R1, the second inductive resistor R2, the third inductive resistor R3 and the fourth inductive resistor R4 may be different from each other.

In one embodiment, referring to FIG. 11, the pressure sensor further includes a first extension direction 100 and a second extension direction 200. The first extension direction 100 and second extension direction 200 are configured to be crossed with each other. The component of extension length of the first inductive resistor R1 from the first end a to the second end b in the first extension direction 100 is longer than that in the second extension direction 200, the component of extension length of the second inductive resistor R2 from the first end b' to the second end c in the second extension direction 200 is longer than that in the first extension direction 100, the component of extension length of the third inductive resistor R3 from the first end d' to the second end c' in the first extension direction 100 is longer than that in the second extension direction 200, the component of extension length of the fourth inductive resistor R4 from the first end a' to the second end d in the second extension direction 200 is longer than that in the first extension direction 100.

In such the configuration, the strain in the first extension direction 100 may be sensed by the first inductive resistor R1 and the third inductive resistor R3, and the strain in the second extension direction 200 may be sensed by the second inductive resistor R2 and the fourth inductive resistor R4. Since the direction in which the strain is sensed by the first inductive resistor R1 is different from the direction in which the strain is sensed by the second inductive resistor R2, and the direction in which the strain is sensed by the fourth inductive resistor R4 is different from the direction in which the strain is sensed by the third inductive resistor R3, the first inductive resistor R1, the second inductive resistor R2, the third inductive resistor R3 and the fourth inductive resistor R4 may be disposed in the same position or the positions close to each other, so that the first inductive resistor R1, the second inductive resistor R2, the third inductive resistor R3 and the fourth inductive resistor R4 have synchronous temperature change, thereby eliminating the affection caused by the temperature difference and hence improving the pressure-inductive accuracy.

Figure 12:
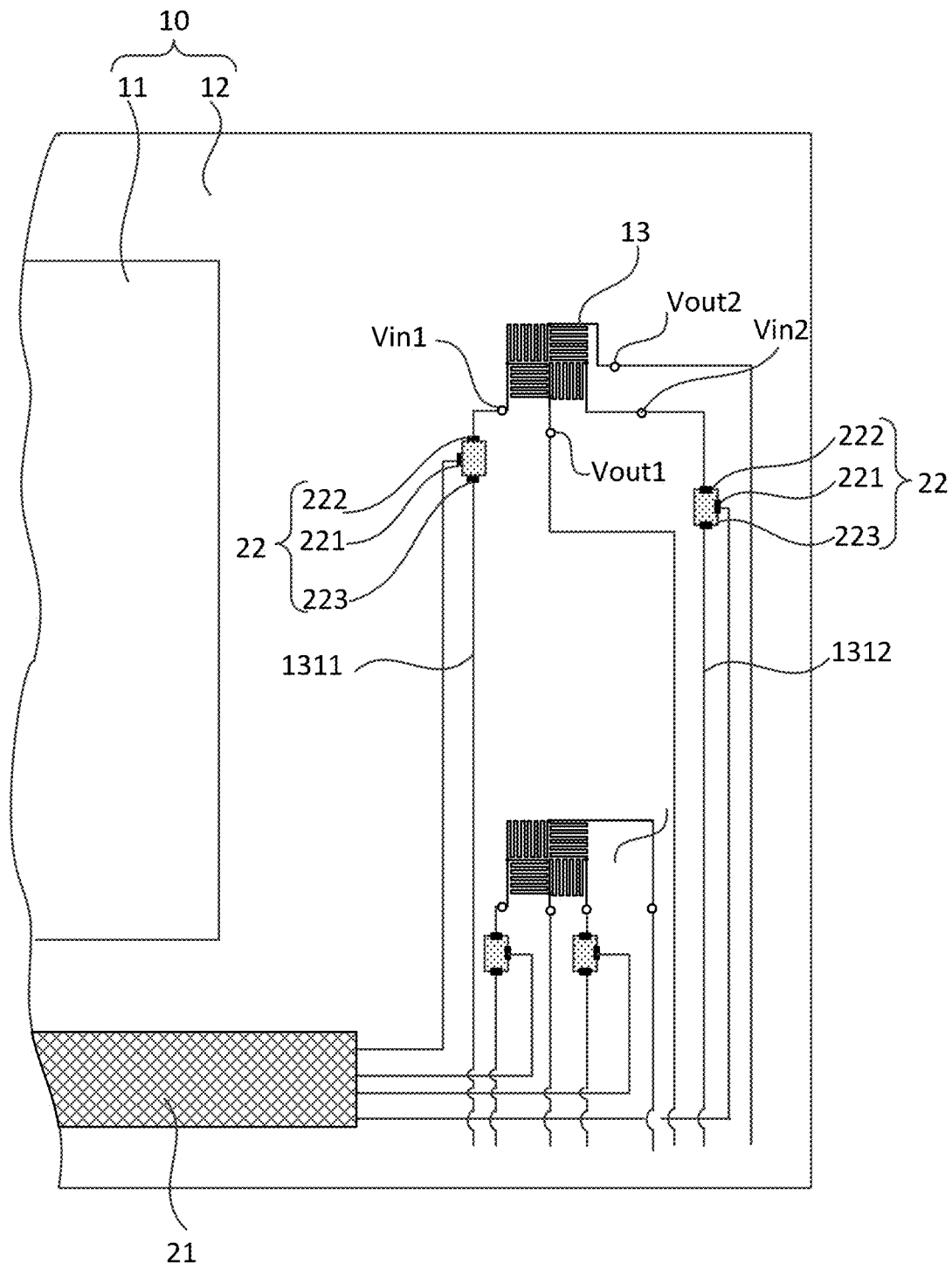
FIG. 12 is a partial structural diagram showing another display panel according to an embodiment of the present disclosure.

FIG. 12 is a partial structure diagram showing another display panel according to an embodiment of the present disclosure. Referring to FIG. 12, the display panel includes at least a first signal input line 1311 and at least a second signal input line 1312; the control switch 22 includes a control terminal 221, a first electrode 222 and a second electrode 223; the control terminal 221 is electrically connected to the control chip 21 to control turning on and off of the control switch 22; the first electrode 222 is electrically connected to the first power signal inputting terminal Vin1 of the pressure sensor 13, the second electrode 223 is electrically connected to the first signal input line 1311; or, the first electrode 222 is electrically connected to the second power signal inputting terminal Vin2 of the pressure sensor 13, the second electrode 223 is electrically connected to the second signal input line 1312. The advantage of such the configurations lies in that the operation state of each of the pressure sensors 13 may be targetedly controlled according to the corresponding relation between the current touch position and the pressure sensor 13, so that the display panel can be in a low power consumption state during the touch pressure detection.

Figure 13:
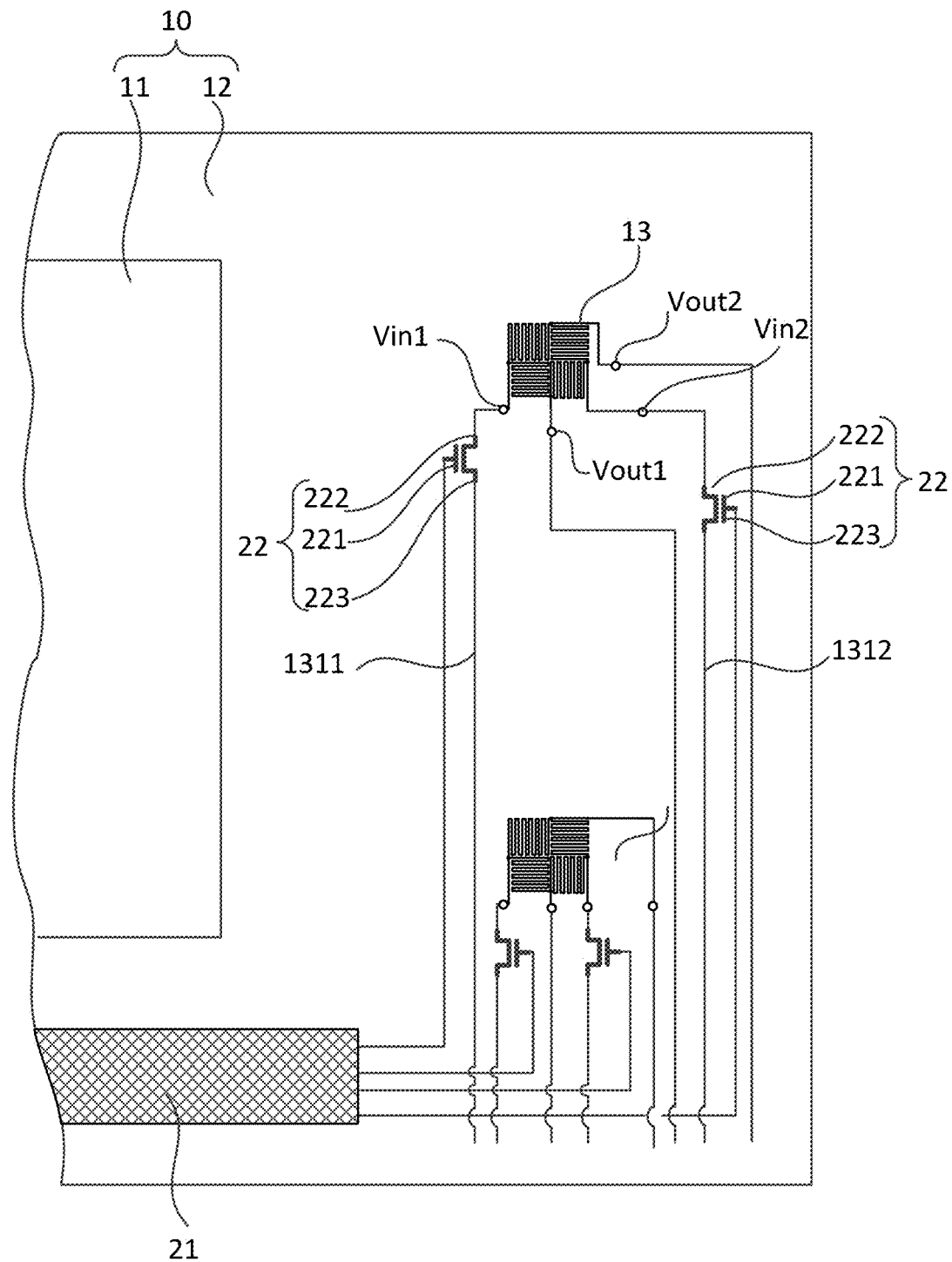
FIG. 13 is a partial structural diagram showing another display panel according to an embodiment of the present disclosure.

Specifically, there are various structures for the control switch. FIG. 13 is a partial structure diagram showing another display panel according to an embodiment of the present disclosure. In one embodiment, referring to FIG. 13, the control switch 22 includes a thin film transistor. The thin film transistor includes a source electrode, a drain electrode and a gate electrode; and the source electrode is the second electrode 223 of the control switch 22, the drain electrode is the first electrode 222 of the control switch 22, the gate electrode is the control terminal 221 of the control switch 22. The advantages of using a thin film transistor as the control switch lies in that, the structure is simple, the area for manufacturing the thin film transistor in the non-display region is small and it conforms to developing trends of narrow bezel design. In addition, the display panel generally includes a plurality of thin film transistors which are used to control the operation state of the pixel units, and thin film transistors which are integrated into the thin film transistors to generate scanning signals. In one embodiment, the thin film transistors acting as the control switch may be manufactured in the same process with the thin film transistors used to control the operation state of the pixel units and the thin film transistors which are used to generate scanning signals, thereby reducing the number of the process, simplifying the manufacturing process and reducing the production cost.

Figure 14:
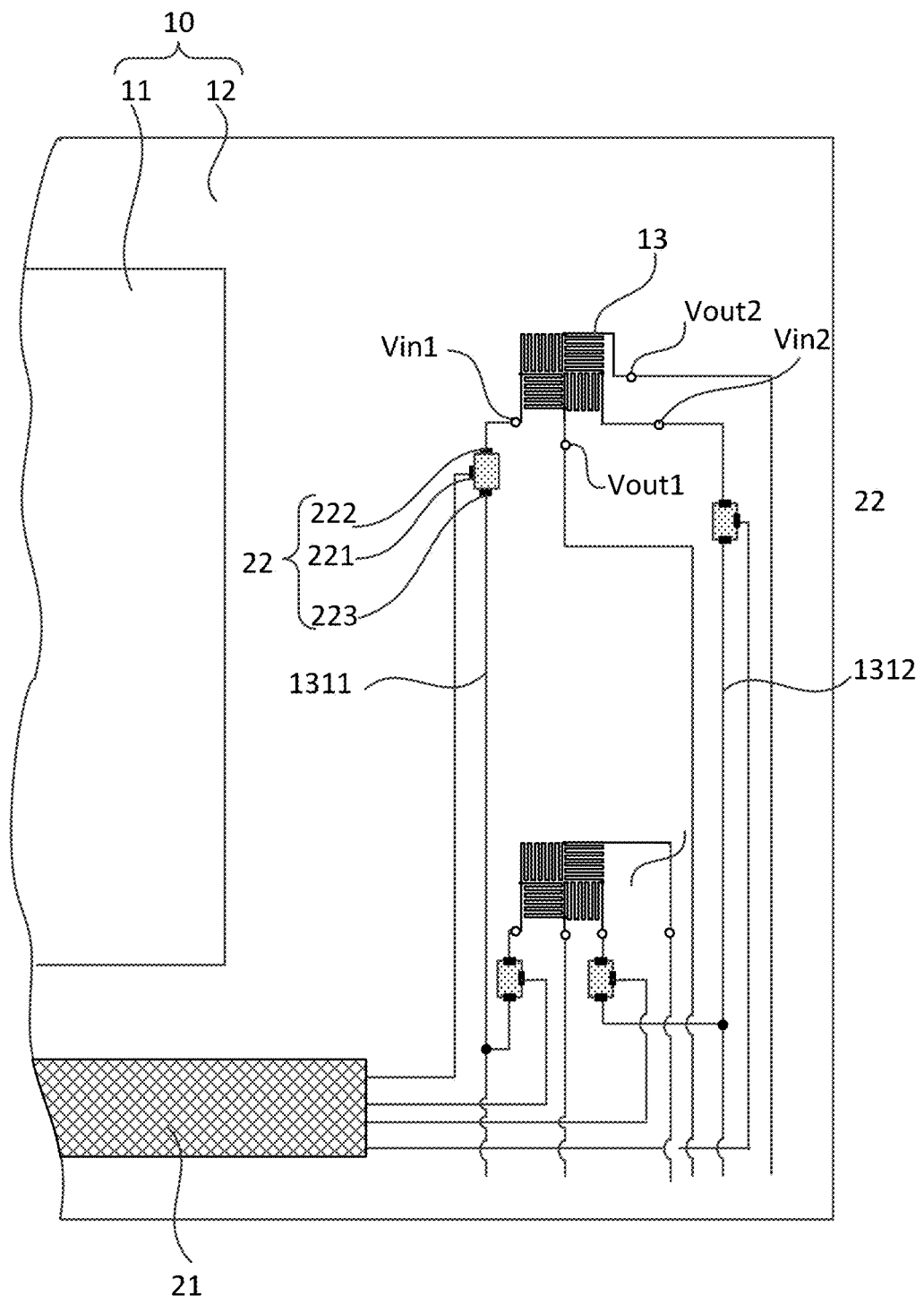
FIG. 14 is a partial structural diagram showing another display panel according to an embodiment of the present disclosure.

FIG. 14 is a partial structure diagram showing another display panel according to an embodiment of the present disclosure. Referring to FIG. 14, based on above technical solutions, the first power signal inputting terminal Vin1 of each of the pressure sensors 13 disposed at the same side of the display region 11 are all connected to one of the first signal input lines 1311 through the control switch 22; the second power signal inputting terminal Vin2 of each of the pressure sensors 13 disposed at the same side of the display region 11 are all connected to one of the second signal input lines 1312 through the control switch 22. The advantage of such the configuration lies in that there is no need to arrange a first signal input line 1311 and a second signal input line 1312 for each pressure sensor 13, and it is only necessary to arrange a first signal input line 1311 and a second signal input line 1312 at each side of the display region so as to meet the requirement for inputting the bias voltage to all the pressure sensors 13 at the side of the display region, thereby largely reducing the number of the wirings of the first signal input line 1311 and the second signal input line 1312, avoiding the excessive occupation of the space for wirings and conforming to developing trends of narrow frame design.

It should be noted, in above technical solutions, the current touch position refers to the pressed position where the user presses the display panel at present. The method of obtaining the current touch position may be various, for example, the current touch position may be obtained by calculating the detection of the touch electrode on the display panel, or obtained by other hardware or software, which is not limited herein.

Figure 15:
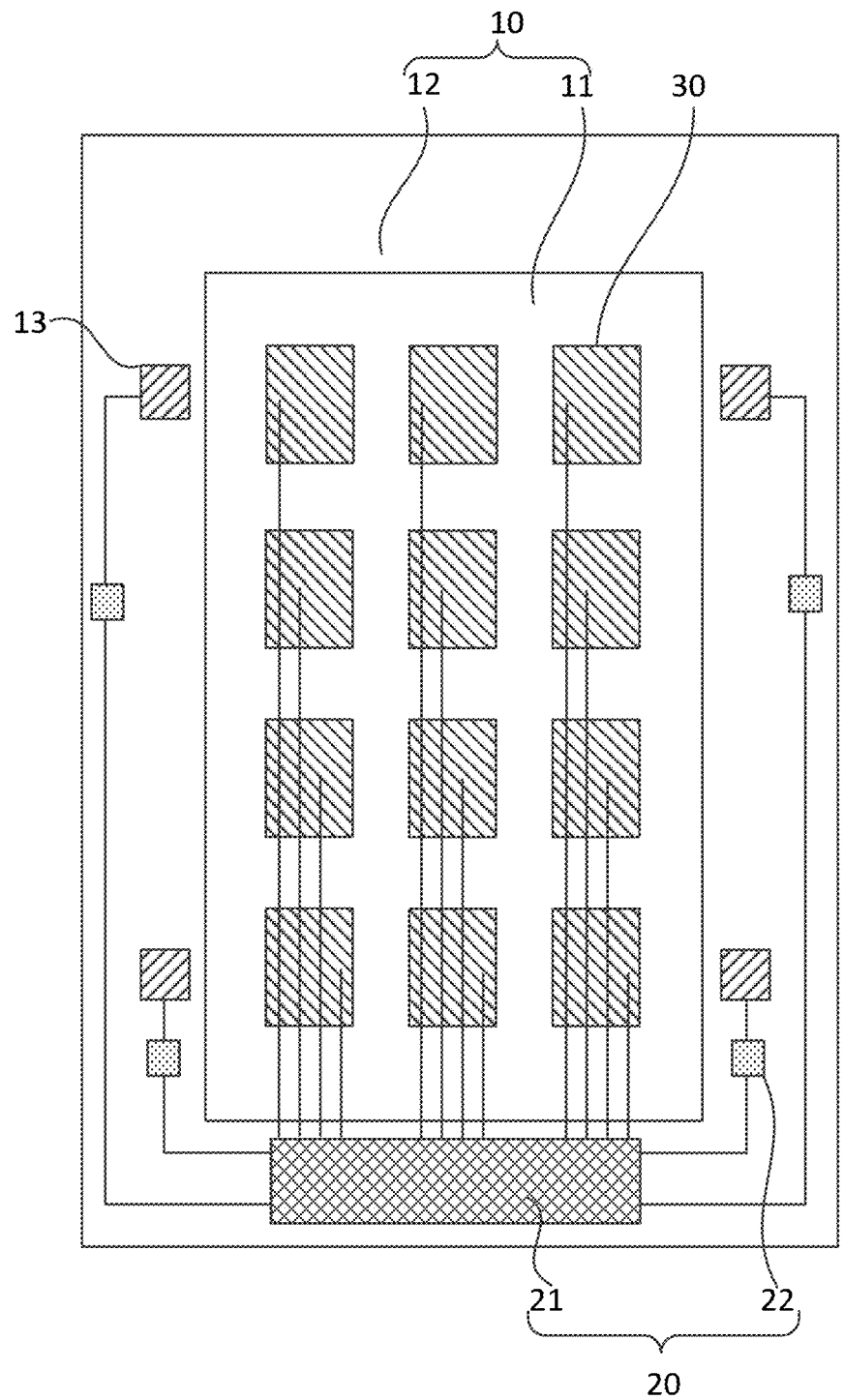
FIG. 15 is a structural diagram showing another display panel according to an embodiment of the present disclosure.

FIG. 15 is a structural diagram showing another display panel according to an embodiment of the present disclosure. Referring to FIG. 15, the display panel further includes a touch electrode 30, and the touch electrode 30 may a self-capacitance touch electrode or a mutual-capacitance touch electrode; and the control chip 21 is electrically connected to the touch electrode 30.

Exemplarily, if the touch electrode 30 is a self-capacitance control electrode, referring to FIG. 15, a plurality of self-capacitance control electrodes 30 are arranged in the touch panel. The control electrode 30 is a block-shape electrode, each touch electrode 30 corresponds to a certain coordinate and the touch electrodes 30 forms the capacitors with ground, respectively. When the display panel is touched by a finger, the capacitance of the finger is added to the touched touch electrode 30, thereby changing the capacitance of the touched touch electrode 30 to the ground. Since the change in the capacitance of the touch electrode 30 to the ground is reflected by the change in the signal of the touch electrode 30, the signal change of each touch electrode 30 can be detected, so that the touch electrode 30 of which the signal is changed can be determined, thereby determining the coordinate corresponding to the touch electrode 30 of which the signal is changed, and hence determining the touch position of the finger.

Figure 16:
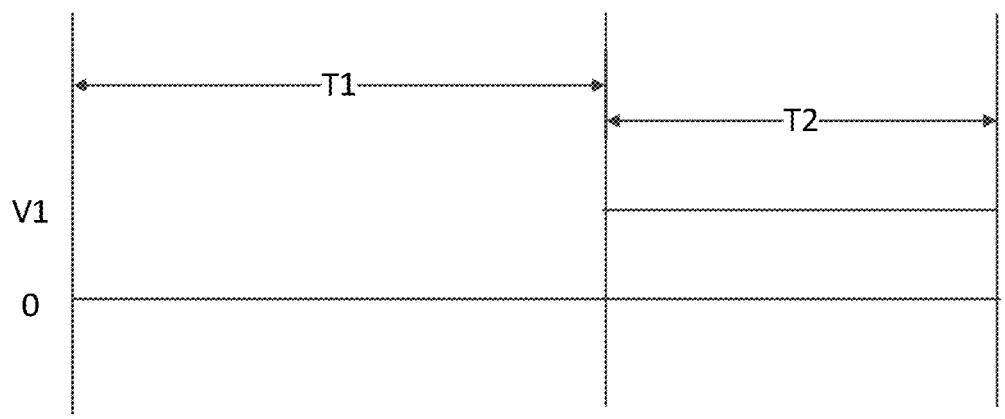
FIG. 16 is a waveform graph of the applied voltage on the pressure sensor for a display panel in the working state according to an embodiment of the present disclosure.

FIG. 16 is a waveform graph of the applied voltage on the pressure sensor for a display panel in working state according to an embodiment of the present disclosure. Referring to FIG. 16, in practice, the display panel includes a touch position detection stage T1 and a touch pressure detection T2; in the touch position detection stage T1, the pressure sensors are in an off state, so that the voltage signal the inputted to the pressure sensor is zero, the touch position is detected by the touch electrode to determine the current touch position; in the touch pressure detection stage T2, the operation state of each of the pressure sensors are adjusted based on the current touch position in such a way that at least one of the pressure sensors corresponding to the touch position and meeting the preset corresponding relation is in a working state (the bias voltage signal inputted thereto is V1) and other pressure sensors are in an off state (the bias voltage inputted thereto is zero), so as to perform the touch pressure detection.

In above technical solutions, the touch electrodes is provided in the display panel and the control chip is electrically connected to the touch electrode, so that the touch position may be calculated by the control chip based on detection of the touch electrode in the touch panel, and hence the pressure sensors corresponding to the touch position and meeting the preset corresponding relation is enabled to be in a working state based on the touch position, and other pressure sensors are enabled to be in an off state, thereby reducing the power consumption and heat dissipation during the pressure detection.

Figure 17:
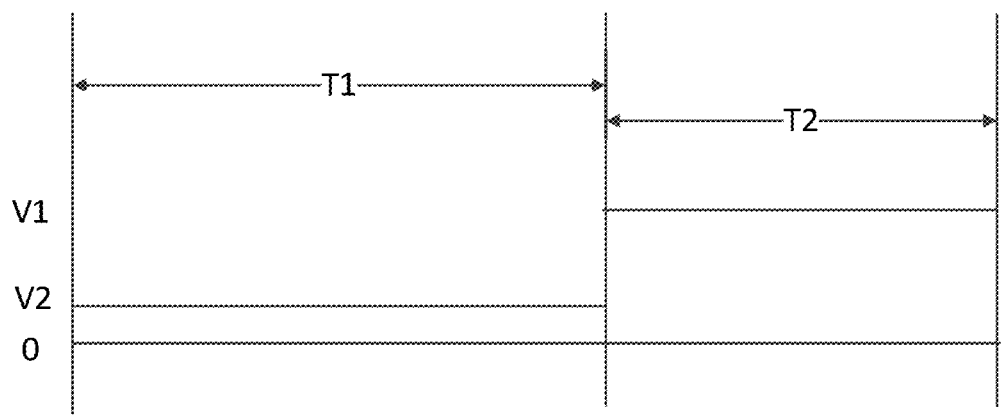
FIG. 17 is a waveform graph of the applied voltage on the pressure sensor for another display panel in the working state according to an embodiment of the present disclosure.

Furthermore, when the pressure sensors are in an off state during the touch position detection stage T1, static electricity may be generated at the pressure sensor and its peripheral circuits, and the phenomenon of residual charge occurs, so that the normal operation of the pressure sensor and the display circuit would be affected. FIG. 17 is a waveform graph of the applied voltage on the pressure sensor for another display panel in working state according to an embodiment of the present disclosure. In one embodiment, as shown in FIG. 17, the pressure sensor is working in low current mode (the voltage signal V2 is inputted to the pressure sensor and V2 is less than V1) in the touch position detection stage T1. Therefore, the static electricity generated at the pressure sensor and its peripheral circuits would be avoid, and the phenomenon of residual charge may not occur.

Figure 18:
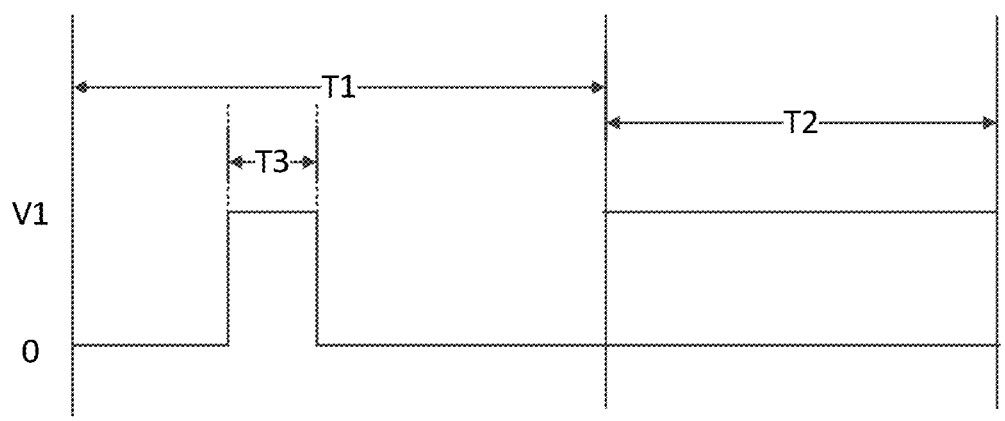
FIG. 18 is a waveform graph of the applied voltage on the pressure sensor for another display panel in working state according to an embodiment of the present disclosure.

FIG. 18 is a waveform graph of the applied voltage on the pressure sensor for another display panel in working state according to an embodiment of the present disclosure. Based on above technical solutions, referring to FIG. 18, the touch position detection T1 stage includes a base noise acquisition stage T3. The time period of the base noise acquisition stage T3 is less than or equal to 10% of the time period of the touch position detection stage T1, the pressure sensor is in a working state (the voltage signal V1 is inputted to the pressure sensor) in the base noise acquisition stage T3. In other stages of the touch position detection stage T1 except the base noise acquisition stage T3, the pressure sensor is in an off state or a working state with low current. In FIG. 18, exemplarily, in other stages of the touch position detection stage T1 except the base noise acquisition stage T3, the pressure sensor is in an off state and the voltage signal inputted to the pressure sensor is zero. In such a configuration, the value of the touch pressure detected by the pressure sensor may be corrected based on the captured base noise, thereby improving the detection accuracy of the pressure sensor for the touch pressure.

Figure 19:
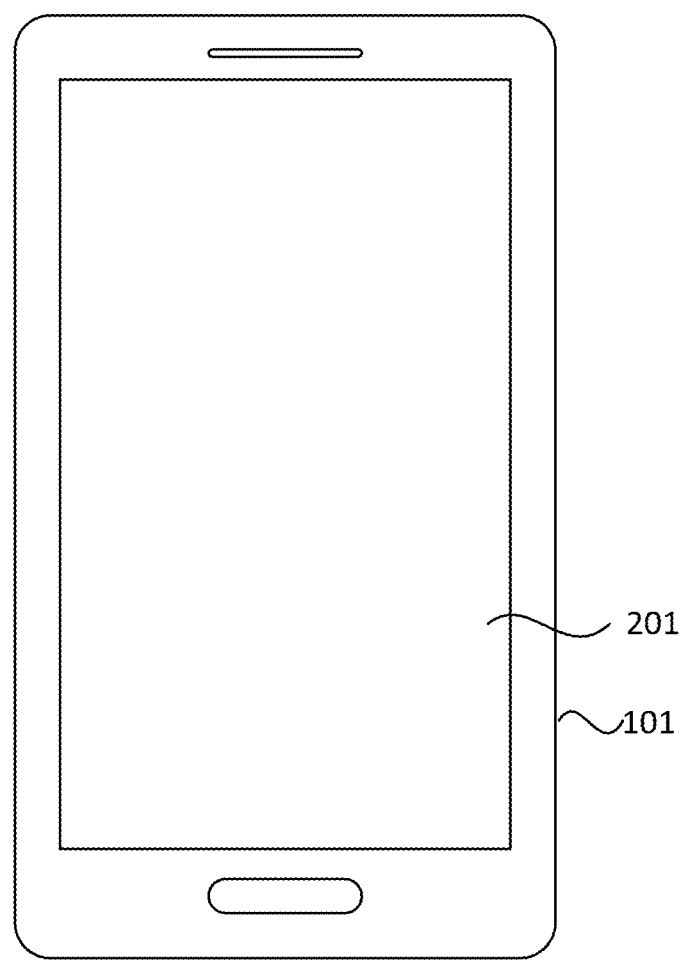
FIG. 19 is a structural diagram showing a touch display device according to an embodiment of the present disclosure.

The embodiments of the present disclosure further provide a touch display device. FIG. 19 is a structural diagram showing a touch display device provided according to an embodiment of the present disclosure. Referring to FIG. 19, the touch display device 101 includes any one of the display panels 201 provided by above embodiments of the present disclosure. The touch display device may be mobile phones, tablet computers, wearable devices, etc.

In the embodiments of the present disclosure, in the touch pressure detection stage, the operation state of each of the pressure sensors are adjusted based on the current touch position in such a way that at least one of the pressure sensor corresponding to the touch position and meeting the preset corresponding relation is enabled in a working state and other pressure sensors are enabled in an off state so as to perform the touch pressure detection, thereby solving the problems in related display panels that a high power consumption and excessively generated heat caused by simultaneously turning on all the pressure sensors in the touch pressure detection stage, thereby achieving the reduction on the power consumption and the generated heat of the display panel during the touch pressure detection.

Figure 20:
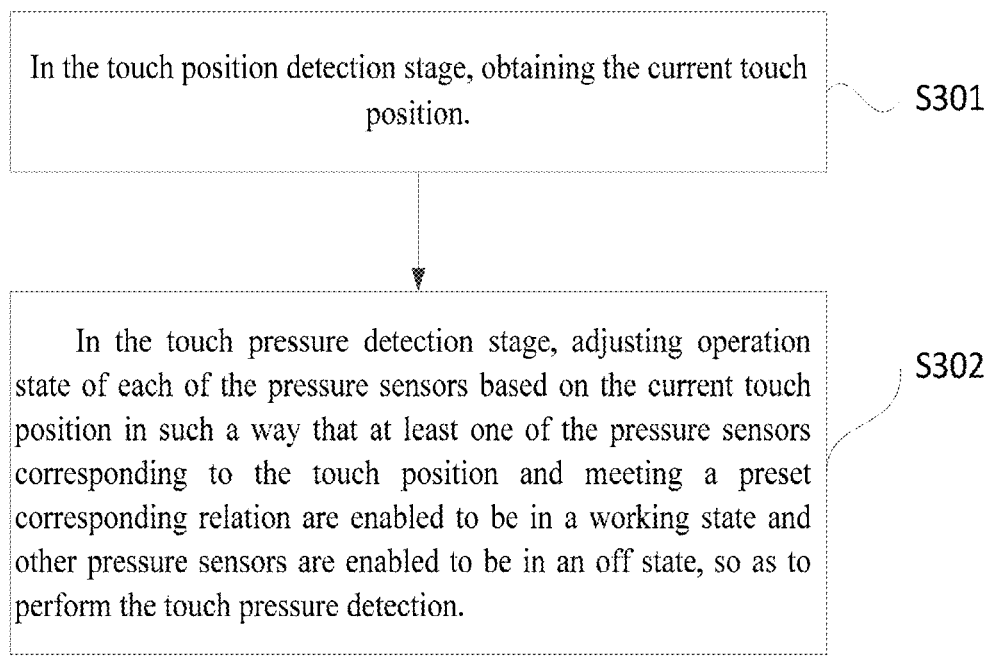
FIG. 20 is a flow diagram for a touch pressure detection method according to an embodiment of the present disclosure.

The embodiments of the present disclosure further provide a touch pressure detecting method which is applicable to the display panel provided by the present disclosure. FIG. 20 is a flow diagram for a touch pressure detecting method according to an embodiment of the present disclosure. Referring to FIG. 20, the display panel includes the touch position detection stage and the touch pressure detection stage;

Step S301: In the touch position detection stage, acquiring the current touch position;

Step S302: In the touch pressure detection stage, the operation state of each of the pressure sensors is adjusted based on the current touch position in such a way that at least one of the pressure sensor corresponding to the touch position and meeting a preset corresponding relation is enabled to be in a working state, other pressure sensors are enabled to be in an off state so as to perform the touch pressure detection.

In the touch pressure detection stage according to the embodiments of the present disclosure, the operation state of each of the pressure sensors is adjusted based on the current touch position in such a way that at least one of the pressure sensors corresponding to the touch position and meeting the preset corresponding relation is enabled to be in a working state and other pressure sensors are in an off state so as to perform the touch pressure detection, solving the problems of the display panels in a prior art that a high power consumption and excessively generated heat caused by simultaneously turning on of each of the pressure sensors in the touch pressure detection stage, achieving the reduction on the power consumption and the generated heat of the display panel during the touch pressure detection.

Furthermore, before the step for adjusting the operation state of each of the pressure sensors based on the current touch position in such a way that at least one of the pressure sensors corresponding to the touch position and meeting the preset corresponding relation is enabled to be in a working state and other pressure sensors are in an off state, including:

dividing the display panel into a plurality of sub-touch regions, every sub-touch region is provided to correspond to at least one of the semiconductor pressures;

the step for adjusting an operation state of each of the pressure sensors based on the current touch position in such a way that at least one of the pressure sensors corresponding to the touch position and meeting the preset corresponding relation is enabled to be in a working state, other pressure sensors are in an off state includes:

determining the sub-touch region where the current touch position located, based on the current touch position, turning on the pressure sensors corresponding to the touch position and meeting the preset corresponding relation and turning off other pressure sensors sub-touch region in the display panel.

Furthermore, the step for adjusting an operation state of each of the pressure sensors based on the current touch position in such a way that at least one of the pressure sensors corresponding to the touch position and meeting the preset corresponding relation is enabled to be in a working state, other pressure sensors are in an off state includes:

calculating the distance between the current touch position and each of the pressure sensors based on the current touch position, turning on at least one of the pressure sensors of in which distance between the current touch positions and the pressure sensor is less than the preset distance, and turning off other pressure sensors in the display panel.

Furthermore, in touch position detection stage, adjusting the operation state of each of the pressure sensors in such a way that, each of the pressure sensors is enabled to be in an off state or a working state with low current.

Furthermore, the touch position detection stage includes a base noise acquisition stage; the time period of the base noise acquisition stage is less than or equal to 10% of the time period of the touch position detection stage; and in the base noise acquisition stage, the pressure sensor is in a working state.

It should be noted that the above includes embodiments of the present disclosure. It can be understood for those of ordinary skill in the art that the present disclosure is not limited to specific embodiments described herein. For those skilled in the art, the present disclosure may be subject to various apparent variations, readjustments and replacements without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:

1. A display panel, comprising:
a substrate, comprising a display region and a non-display region surrounding the display region;
at least two pressure sensors arranged in the non-display region, wherein each of the pressure sensors is a quadrangle and made of semiconductor material, the each of the pressure sensors comprises a first side and a second side which are configured to be opposite to each other, and a third side and a fourth side which are configured to be opposite to each other, wherein the each of the pressure sensors comprises a first power signal inputting terminal at the first side and a second power signal inputting terminal at the second side, to input a bias voltage signal to the each of the pressure sensors, and wherein the each of the pressure sensors further comprises a first induction signal measuring terminal at the third side and a second induction signal measuring terminal at the fourth side, to output a pressure-sensitive detection signal of the each of the pressure sensors;
a control module electrically connected to the pressure sensors, which is configured to control an operation state of the each of the pressure sensors, wherein the control module comprises a control chip and at least a control switch, wherein the control chip is electrically connected to the control switch, the control switch is electrically connected to the pressure sensors, the control chip is configured to control the operation state of the each of the pressure sensors by controlling turning on and turning off of the control switch;
wherein the display panel comprises at least a first signal input line and at least a second signal input line, the control switch comprises a control terminal, a first electrode and a second electrode;
wherein the control terminal is electrically connected to the control chip to control the control switch to be turned on and turned off;
when the first electrode is electrically connected to the first power signal inputting terminal of the each of the pressure sensors, the second electrode is electrically connected to the first signal input line; and
when the first electrode is electrically connected to the second power signal inputting terminal of the each of the pressure sensors, the second electrode is electrically connected to the second signal input line; and
wherein in a touch pressure detection stage, the operation state of the each of the pressure sensors is adjusted based on a current touch position in such a way that at least one of the pressure sensors corresponding to the current touch position and meeting a preset corresponding relation is enabled to be in a working state and other pressure sensors are enabled to be in an off state, so as to perform the touch pressure detection.

2. The display panel according to claim 1 wherein the control switch comprises a thin film transistor, and the thin film transistor comprises a source electrode, a drain electrode and a gate electrode; and
the source electrode is the second electrode of the control switch, the drain electrode is the first electrode of the control switch, and the gate electrode is the control terminal of the control switch.

3. The display panel according to claim 1, wherein the first power signal inputting terminal of the each of the pressure sensors arranged at a side of the display region are all connected to one of first signal input lines through the control switch;
the second power signal inputting terminal of the each of the pressure sensors arranged at the same side of the display region are all connected to one of second signal input lines through the control switch.

4. The display panel according to claim 1, wherein the each of the pressure sensors comprises a first inductive resistor, a second inductive resistor, a third inductive resistor and a fourth inductive resistor;
first ends of the first inductive resistor and the fourth inductive resistor are electrically connected to the first power signal inputting terminal, a second end of the first inductive resistor and a first end of the second inductive resistor are electrically connected to the first induction signal measuring terminal, a second end of the fourth inductive resistor and a first end of the third inductive resistor are electrically connected to the second induction signal measuring terminal, and second ends of the second inductive resistor and the third inductive resistor are electrically connected to the second power signal inputting terminal;
the first power signal inputting terminal and the second power signal inputting terminal are used to input the bias voltage signal to the each of the pressure sensors; and
the first induction signal measuring terminal and the second induction signal measuring terminal are used to output the pressure-sensitive detection signal of the each of the pressure sensors.

5. The display panel according to claim 4, wherein the each of the pressure sensors further comprises a first extension direction and a second extension direction, wherein the first extension direction is intersected with the second extension direction;
a component of extension length of the first inductive resistor from the first end to the second end in the first extension direction is longer than that in the second extension direction, a component of extension length of the second inductive resistor from the first end to the second end in the second extension direction is longer than that in the first extension direction, a component of extension length of the third inductive resistor from the first end to the second end in the first extension direction is longer than that in the second extension direction, a component of extension length of the fourth inductive resistor from the first end to the second end in the second extension direction is longer than that in the first extension direction.

6. The display panel according to claim 4, wherein the control switch comprises a thin film transistor, and the thin film transistor comprises a source electrode, a drain electrode and a gate electrode; and
the source electrode is the second electrode of the control switch, the drain electrode is the first electrode of the control switch, and the gate electrode is the control terminal of the control switch.

7. The display panel according to claim 4, wherein
the first power signal inputting terminal of the each of the pressure sensors arranged at a side of the display region are all connected to one of first signal input lines through the control switch;
the second power signal inputting terminal of the each of the pressure sensors arranged at the same side of the display region are all connected to one of second signal input lines through the control switch.

8. The display panel according to claim 1, wherein
the display panel further comprises a touch electrode, and the touch electrode is a self-capacitance touch electrode or a mutual-capacitance touch electrode;
the control chip is electrically connected to the touch electrode.

9. The display panel according to claim 8, wherein
the display panel comprises a touch position detection stage;
wherein in the touch position detection stage, the each of the pressure sensors is in an off state or a working state with low current.

10. A touch pressure detecting method for a display panel, wherein
the display panel comprises:
a substrate, comprising a display region and a non-display region surrounding the display region;
at least two pressure sensors arranged in the non-display region;
a control module electrically connected to the pressure sensors, which is configured to control an operation state of each of the pressure sensors;
a touch position detection stage and a touch pressure detection stage; and
the method comprises:
in the touch position detection stage, obtaining a current touch position; and
in the touch pressure detection stage, adjusting an operation state of the each of the pressure sensors based on the current touch position in such a way that at least one of the pressure sensors corresponding to the current touch position and meeting a preset corresponding relation is enabled to be in a working state and other pressure sensors are enabled to be in an off state, so as to perform the touch pressure detection;
wherein the step for adjusting the operation state of the each of the pressure sensors based on the current touch position in such a way that the at least one of the pressure sensors corresponding to the touch position and meeting the preset corresponding relation is enabled to be in the working state and the other pressure sensors are enabled to be in the off state comprises:
calculating the distance between the current touch position and the each of the pressure sensors based on the current touch position, turning on at least one pressure senor of the pressure sensors in which a distance between the current touch position and the pressure sensor is less than a preset distance, and turning off other pressure sensors in the display panel.

11. The touch pressure detecting method according to claim 10, wherein
before the step for adjusting the operation state of the each of the pressure sensors based on the current touch position in such a way that the at least one of the pressure sensors corresponding to the current touch position and meeting the preset corresponding relation is enabled to be in the working state and the other pressure sensors are enabled to be in the off state, the method comprises:
dividing the display panel into a plurality of sub-touch regions, wherein each of the sub-touch regions is provided to correspond to at least one of the pressure sensors; and
the step for adjusting the operation state of the each of the pressure sensors based on the current touch position in such a way that the at least one of the pressure sensors corresponding to the current touch position and meeting the preset corresponding relation is enabled to be in the working state and the other pressure sensors are enabled to be in the off state comprises:
determining a sub-touch region where the current touch position is located, based on the current touch position, turning on the at least one of the pressure sensors corresponding to the touch position and meeting the preset corresponding relation and turning off the other pressure sensors in the display panel.

12. The touch pressure detecting method according to claim 10, further comprising:
in the touch position detection stage, adjusting the operation state of the each of the pressure sensors in such a way that the each of the pressure sensors is enabled to be in an off state or a working state with low current.

13. The touch pressure detecting method according to claim 10, wherein
the touch position detection stage comprises a base noise acquisition stage;
the time period of the base noise acquisition stage is less than or equal to 10% of the time period of the touch position detection stage; and
in the base noise acquisition stage, the pressure sensor is in the working state.

14. A display panel, comprising:
a substrate, comprising a display region and a non-display region surrounding the display region;
at least two pressure sensors arranged in the non-display region, wherein each of the pressure sensors is a quadrangle and made of semiconductor material, the each of the pressure sensors comprises a first side and a second side which are configured to be opposite to each other, and a third side and a fourth side which are configured to be opposite to each other, wherein the each of the pressure sensors comprises a first power signal inputting terminal at the first side and a second power signal inputting terminal at the second side, to input a bias voltage signal to the each of the pressure sensors, wherein the each of the pressure sensors further comprises a first induction signal measuring terminal at the third side and a second induction signal measuring terminal at the fourth side, to output a pressure-sensitive detection signal of the each of the pressure sensors;
a control module electrically connected to the pressure sensors, which is configured to control an operation state of the each of the pressure sensors, wherein the control module comprises a control chip and at least a control switch, wherein the control chip is electrically connected to the control switch, the control switch is electrically connected to the pressure sensors, the control chip is configured to control the operation state of the each of the pressure sensors by controlling turning on and turning off of the control switch;
wherein the control switch comprises a control electrode, a perpendicular projection of the control electrode on the substrate is at least partially overlapped with a perpendicular projection of one of the pressure sensors on the substrate, and the control electrode is configured to be insulated with the one of the pressure sensors and is electrically connected to the control chip; and wherein in a touch pressure detection stage, the operation state of the each of the pressure sensors is adjusted based on a current touch position in such a way that at least one of the pressure sensors corresponding to the current touch position and meeting a preset corresponding relation is enabled to be in a working state and other pressure sensors are enabled to be in an off state, so as to perform the touch pressure detection.

15. The display panel according to claim 14, wherein
the display panel further comprises a touch electrode, and the touch electrode is a self-capacitance touch electrode or a mutual-capacitance touch electrode;

the control chip is electrically connected to the touch electrode.

16. The display panel according to claim 15, wherein
the display panel comprises a touch position detection stage;

wherein in the touch position detection stage, the each of the pressure sensors is in an off state or a working state with low current.

* * * * *